Patented July 26, 1949

UNITED STATES PATENT OFFICE 2,477,342

ARYLOXYALKENES

Earl T. McBee, La Fayette, Ind., and Robert O. Bolt, Richmond, Calif., assignors to Purdue Research Foundation, La Fayette, Ind., a corporation of Indiana No Drawing. Application September 11, 1946, Serial No. 696,373

4 Claims. (Cl. 260—612)

This invention relates to a group of novel compounds identified as the fluorine-containing aryloxyalkenes and is inclusive of compounds of the general formula $$(Z)_n\text{---}R\text{---}O\text{---}CF=CXY$$

wherein R is a naphthyl or phenyl residue; Z is $CH_3$ or $CF_3$; n is selected from 0, 1, and 2; wherein X is hydrogen, chlorine, or fluorine; and wherein Y is hydrogen, chlorine, fluorine, an alkyl or halogen-substituted alkyl radical containing up to 2 carbon atoms, inclusive. These compounds are useful as heat-transfer media and as chemical intermediates.

The compounds may be prepared by the dehalogenation of the corresponding halogenated aryloxyalkanes by means of a suitable dehalogenating agent, e. g., zinc in ethanol, or by the dehydrohalogenation of a suitable halogenated aryloxyalkane by means of an appropriate dehydrohalogenating agent, e. g., aqueous sodium hydroxide solution. They may also be synthesized by condensing a suitable alkali metal aryloxide or substituted aryloxide, e. g., sodium phenoxide, sodium methylphenoxide, sodium trifluoromethylphenoxide, sodium napthoxide, et cetera, and a poly(chlorofluoro)alkane, e. g., 1,2-dichloro-1,1-difluoroethane, 1,2,2-trichloro-1,1-difluoroethane, 2 - chloro-1,1,1,3,3,3 - hexafluoropropane, et cetra, at low or moderate temperature, for example, zero to 150 degrees centigrade, in an acetone or other non-reactive solvent medium and recovering the product from a basic reaction mixture by steam distillation followed by drying and rectification of the organic layer of the distillate. In some cases it may be necessary to employ the more reactive potassium aryloxide, and the reaction medium may be selected to allow optimum solubility of the particular aryloxide and poly(chlorofluoro) alkane concerned in the reaction. A preponderance of the halogenated aryloxyalkane, from which the halogenated aryloxyalkane may be considered as being derived by dehalogenation or dehydrohalogenation, is usually also formed in any particular condensation reaction.

The following examples illustrate several ways in which members of the new group of compounds may be prepared, but are not to be construed as limiting.

EXAMPLE 1

Phenoxy - 2,2 - dichloro - 1,1 - difluoroethane (0.22 mole), 0.78 mole of zinc powder and 150 milliliters of 95 per cent ethanol were mixed in a flask fitted with a sealed-stirrer, reflux condenser and thermometer. The temperature was maintained at reflux, about 78 degrees centigrade, and constant stirring was employed over a period of thirty-three hours. The reaction mixture was then steam-distilled, and the lower layer of the distillate separated and dried. Rectification of this organic product yielded 0.15 mole of phenoxy-2-chloro-1-fluoroethene, boiling at 57.2 to 57.3 degrees centigrade at six millimeters of mercury pressure absolute.

EXAMPLE 2

Anhydrous sodium 3 - methylphenoxide (2 moles) and a small amount of toluene were dissolved in a liter of anhydrous acetone in a flask fitted with sealed stirrer, reflux condenser and thermometer. The mixture was cooled to 7 degrees centigrade by means of an ice bath and two moles (270 grams) of 1,2-dichloro-1,1-difluoroethane was added with constant agitation over a two-hour period. No temperature increase occurred during the addition. The reaction mixture was warmed to room temperature and finally heated for 12 hours at 40–50 degrees centigrade. Acetone was then stripped from the mixture and after the residue was made basic (pH 9), steam-distillation was used to remove organic reaction products. The organic layer of the distillate was separated, dried with sodium sulfate, and then rectified. The fraction boiling at 64.0–64.4 degrees centigrade at 4.0 millimeters of mercury pressure absolute was identified as (3 - methylphenoxy) - 2 - chloro-1-fluoroethene. The majority of the product was identified as (3 - methylphenoxy) - 2 - chloro-1,1-difluoroethane.

EXAMPLE 3

Two moles of anhydrous sodium 2-methylphenoxide was dissolved in 800 milliliters of anhydrous acetone in a three-neck, two-liter flask fitted with a sealed-stirrer, separatory funnel, reflux condenser and thermometer. The condenser was connected at its exit end to a Dry Ice-cooled trap. The reaction mixture was cooled to between five and ten degrees centigrade and two moles (270 grams) of 1,2-dichloro-1,1-difluoroethane was added with continuous stirring over a period of two hours. The mixture was then refluxed gently for about 17 hours, at the end of which time the reflux condenser was arranged to allow distillation. About 800 milliliters of organic material distilled and after two moles of dilute sodium hydroxide had been added to the residue, an additional amount of organic matter was steam-distilled. The distillates were separately washed with water and the organic layers separated and dried over calcium chloride. A considerable amount of 2-chloro-1,1-difluoroethene (0.59 mole) was collected in the Dry-Ice-cooled trap during this experiment. Rectification of the combined organic products of the reaction in a column developing 100 theoretical plates at atmospheric pressure yielded (2- methylphenoxy)-2-chloro-1-fluoroethene, boiling at 59.3 degrees centigrade at 6 millimeters of mercury pressure absolute. The product was mainly (2 - methylphenoxy) - 2 - chloro-1,1-difluoroethane.

EXAMPLE 4

In the same equipment and in a manner analogous to Example 3, two moles of sodium 4-methylphenoxide was condensed with two moles of 1,2-dichloro-1,1-difluoroethane. Forty-one grams (0.42 mole) of 2-chloro-1,1-difluoroethene was collected in the Dry-Ice-cooled trap and rectification yielded (4-methylphenoxy) - 2 - chloro-1-fluoroethene, boiling at 63.6–64.2 degrees centigrade at 6 millimeters of mercury pressure absolute. The product also contained (4-methylphenoxy)-2-chloro-1,1-difluoroethane.

EXAMPLE 5

In a manner similar to Example 3, approximately 0.8 mole of potassium 3-trifluoromethylphenoxide was treated with 1,2-dichloro-1,1-difluoroethane (0.8 mole) in 500 milliliters of anhydrous acetone solvent cooled to ice temperature. The reflux condenser was connected in series with a Dry-Ice-cooled trap and while the mixture was maintained below eight degrees centigrade the 1,2-dichloro-1,1-difluoroethane was added dropwise over a period of one and one-half hours. The reaction mixture was allowed to come to room temperature over a four-hour period, and thereafter was refluxed for twelve hours. The condenser was then adjusted for distillation from the flask and 500 milliliters of organic liquid distilled from the mixture of reaction products. One mole of sodium hydroxide was added to the residue and the resulting mixture steam-distilled. The distillates were separately washed with water and the organic layers separated. The aqueous layers were extracted with chloroform and the extracts combined with the organic layer. The combined organic layers were dried over calcium chloride and rectified in an efficient column to separate (3-trifluoromethylphenoxy) - 2 - chloro-1-fluoroethene, boiling at 50–52 degrees centigrade at six millimeters of mercury pressure absolute. The Dry-Ice-cooled trap collected 0.28 mole of 2-chloro-1,1-difluoroethene, formed by dehydrochlorination of starting material. Also contained in the product was (3 - trifluoromethylphenoxy)-2-chloro-1,1-difluoroethane.

EXAMPLE 6

One hundred grams (0.44 mole) of phenoxy-2,2-dichloro-1,1-difluoroethane and ten grams of trimethylbenzylammonium hydroxide (Triton B) were mixed with 210 milliliters of water in a three-neck flask. Potassium hydroxide was then dissolved in the water until the densities of the two layers were about equal. Emulsification was immediate when stirring was begun. The mixture was refluxed for sixteen hours at 115 degrees centigrade. The product was steam-distilled from the reaction mixture and the lower layer was separated. After extracting the aqueous layer with chloroform, the organic layer and extracts were combined, dried, and rectified. Rectification in a Stedman column developing about 100 theoretical plates at atmospheric pressure yielded phenoxy-2,2-dichloro-1-fluoroethene, boiling at 63.0–63.2 degrees centigrade at four millimeters of mercury pressure absolute.

EXAMPLE 7

Two moles (371 grams) of 2-chloro-1,1,1,3,3,3-hexafluoropropane (containing 18.7 per cent chlorine, 61.0 per cent fluorine, and having a molecular weight of 183, as compared with the theoretical content of 19.0 per cent chlorine, 61.2 per cent fluorine and a theoretical molecular weight of 186.5), 1.07 moles (154 grams) of 1-naphthol, 1.07 moles (101 grams) of phenol, 2.14 moles (88 grams) of sodium hydroxide, and 500 milliliters of acetone were placed in an iron autoclave of one liter capacity fitted into a mechanical rocker. The vessel was heated for about seventeen hours between 160 and 170 degrees centigrade before being allowed to cool. The product was then removed from the autoclave, mixed with water, made basic with sodium hydroxide, and steam-distilled. The lower layer of the distillate was separated, dried, mixed with a sample (75 grams) of product formed by the action of sodium phenate on the chlorohexafluoropropane, and rectified. Due to difficulties encountered because of the presence of excess phenol, the material was removed from the column and again steam-distilled from a basic solution before rectification was complete. Several plateaus were found by the rectification, and fractions having a narrow boiling range were taken for analysis. The following compounds were obtained thereby: phenoxy-2-chloro-1,3,3,3-tetrafluoropropene, phenoxy-2-chloro - 1,1,3,3,3 - pentafluoropropane, (1-naphthoxy) - 2 - chloro - 1,1,3,3,3 - pentafluoropropane and (1-naphthoxy)-2-chloro-1,3,3,3-tetrafluoropropene.

Compounds within the scope of our invention include members of the group identified by the following general formula:

$$(Z)_n—R—O—CF=CXY$$

wherein R is selected from phenyl and naphthyl residues; Z is CH$_3$ or CF$_3$; $n$ is selected from 0, 1 and 2; X is hydrogen, chlorine, or fluorine; and Y is hydrogen, chlorine, fluorine, and an alkyl or halogen-substituted alkyl radical, said alkyl and halogen-substituted alkyl radicals containing up to and including 2 carbon atoms. In a preferred embodiment of the invention, X is hydrogen or chlorine and Y is hydrogen, chlorine or CF$_3$.

Other aryloxides which may be reacted in the previously-outlined process to produce the desired aryloxyalkenes include sodium 2,4-dimethylphenoxide, potassium 3,5-bis(trifluoromethyl)phenoxide, dimethylnaphthoxides, (trifluoromethyl)naphthoxides, and the like.

Among (polyhalo)alkanes which may be reacted with the above-named and related aryloxides are included 1-chloro-1,1-difluoroethane, 1,2-dichloro-1,1-difluoroethane, 1,2,2-trichloro-1,1-difluoroethane, 1,1-dichloro-1-fluoroethane, 1-chloro-1,1-difluoropropane, 1,2-dichloro-1,1-difluoropropane, 1,2,3 - trichloro - 1,1-difluoropropane, 1,3,3,3 - tetrachloro - 1,1 - difluoropropane, 1-chloro-1,1,3,3,3-pentafluoropropane, and the like.

In this manner, by reacting a chosen aryloxide and the selected poly(chlorofluoro)alkane, or by the dehalogenation or dehydrohalogenation of the aryloxyalkanes obtained during the condensation, may be produced compounds such as for example, 2,4-bis(trifluoromethyl) phenoxy-1-fluoroethene, phenoxy-2-chloro-1-fluoroethene, naphthoxy-1-fluoroethene, phenoxy-1,2,2-trifluoroethene, 2,4 - dimethylphenoxy-1-fluoropropane, 1-(4-methylnaphthoxy)-2-chloro-1-fluoropropene, 1-(4-(trifluoromethyl)naphthoxy)-1,3,3-tetrafluoropropene, 2,4-bis(trifluoromethyl)phenoxy-3,3,3-trichloro-1-fluoropropene, 1-(4-methylnaphthoxy) - 3 - chloro - 1,3,3,-trifluoropropene, phenoxy-2,3-dichloro-1,3,3-trifluoropropene and 1 - (4 - trifluoromethyl)naphthoxy-2,2-dichloro-1-fluoroethene.

The following table will serve to indicate physical constants of some of the compounds of the present invention.

X is selected from the group consisting of H, Cl and F; and wherein Y is selected from the group consisting of H, Cl, F and alkyl and halogen-substituted alkyl radicals, the alkene group containing up to two carbon atoms, inclusive.

2. Phenoxy-2,2-dichloro-1-fluoroethene.
3. Phenoxy-2-chloro-1-fluoroethene.
4. Phenoxy - 2 - chloro - 1,3,3-tetrafluoropropene.

EARL T. McBEE.
ROBERT O. BOLT.

TABLE

*Certain aryloxy (polychlorofluoro) alkenes*

| Formula | B. P., °C. 744 MM. | M. P., °C. | $D_4^{27}$ | $N_D^{20}$ | Analyses | | | | | |
|---|---|---|---|---|---|---|---|---|---|---|
| | | | | | Calc'd., percent | | | Found, percent | | |
| | | | | | Cl | F | M.W. | Cl | F | M.W. |
| $C_6H_5OCF=CCl_2$ | 210.0 | −42.0 to −44.5 | 1.3364 | 1.5162 | 34.3 | 9.2 | 207 | 34.2 | 9.0 | 206 |
| $C_6H_5OCF=CHCl$ | 189.5 | −50.0 to −51.0 | 1.2271 | 1.5049 | 20.5 | 11.0 | 172.5 | 20.3 | 11.7 | 172 |
| 2-$CH_3C_6H_4OCF=CHCl$ | 204.5 | −38.5 to −39.0 | 1.1903 | 1.5057 | 19.0 | 10.2 | 186.5 | 18.9 | 10.6 | 185 |
| 3-$CH_3C_6H_4OCF=CHCl$ | 209.0 | Sets to glass | 1.1880 | 1.5031 | 19.0 | 10.2 | 186.5 | 18.7 | 10.5 | 186 |
| 4-$CH_3C_6H_4OCF=CHCl$ | 212.5 | −40.0 to −41.5 | 1.1854 | 1.5032 | 19.0 | 10.2 | 186.5 | 18.8 | 10.7 | 185 |
| 3-$CF_3C_6H_4OCF=CHCl$ | 189.5 | −63.0 to −64.0 | 1.3409 | 1.4454 | 14.8 | 31.6 | 240.5 | 14.4 | 32.6 | 243 |
| $C_6H_5OCF=CClCF_3$ | 184.5 | −53.0 to −56.0 | 1.3673 | 1.4513 | 14.8 | 31.6 | 240.5 | 14.1 | 31.4 | 236 |
| 1-$C_{10}H_7^{(A)}OCF=CClCF_3$ | 275.0 | 10.5 to 13.0 | 1.3859 | 1.5295 | 12.2 | 26.1 | 290.5 | 12.8 | 27.3 | 284 |

A Naphthyl.

Various modifications may be made in the present invention without departing from the spirit or scope thereof, and it is to be understood that we do not limit ourselves except as indicated by the appended claims.

We claim:
1. An aryloxyalkene having the general formula

$$(Z)_n—R—O—CF=CXY$$

wherein R is selected from the group consisting of phenyl and naphthyl radicals; Z is selected from the group consisting of $CH_3$ and $CF_3$; $n$ is selected from the group consisting of 0, 1 and 2;

EARL T. McBEE.
ROBERT O. BOLT.

REFERENCES CITED

The following references are of record in the file of this patent:

UNITED STATES PATENTS

| Number | Name | Date |
|---|---|---|
| 2,409,274 | Hanford | Oct. 15, 1946 |

FOREIGN PATENTS

| Number | Country | Date |
|---|---|---|
| 523,449 | Great Britain | July 15, 1940 |